US011593331B2

(12) United States Patent
Weber (10) Patent No.: US 11,593,331 B2
(45) Date of Patent: Feb. 28, 2023

(54) METHODS AND SYSTEMS FOR CASCADE FILTERING FOR DATA EXPLORATION IN COMPUTER SYSTEMS

(71) Applicant: Development Guild DDI, Inc., Brookline, MA (US)

(72) Inventor: Matthew Weber, Montclair, NJ (US)

(73) Assignee: Development Guild DDI, Inc., Brookline, MA (US)

( * ) Notice: Subject to any disclaimer, the term of this patent is extended or adjusted under 35 U.S.C. 154(b) by 1 day.

(21) Appl. No.: 17/232,615

(22) Filed: Apr. 16, 2021

(65) Prior Publication Data

US 2021/0326314 A1    Oct. 21, 2021

Related U.S. Application Data

(60) Provisional application No. 63/012,019, filed on Apr. 17, 2020.

(51) Int. Cl.
| | | |
|---|---|---|
| *G06F 16/20* | (2019.01) | |
| *G06F 16/215* | (2019.01) | |
| *H04L 67/10* | (2022.01) | |
| *G06F 16/9535* | (2019.01) | |
| *G06F 16/22* | (2019.01) | |
| *G06F 3/04847* | (2022.01) | |

(52) U.S. Cl.
CPC ........ *G06F 16/215* (2019.01); *G06F 3/04847* (2013.01); *G06F 16/2246* (2019.01); *G06F 16/9535* (2019.01); *H04L 67/10* (2013.01)

(58) Field of Classification Search
None
See application file for complete search history.

(56) References Cited

U.S. PATENT DOCUMENTS

| | | | | |
|---|---|---|---|---|
| 10,387,888 B2 * | 8/2019 | Sapoznik | ............. | G06N 3/0445 |
| 2016/0124699 A1 * | 5/2016 | Fukuhara | ............. | G06F 3/1423 |
| | | | | 345/1.3 |

* cited by examiner

*Primary Examiner* — Belix M Ortiz Ditren
(74) *Attorney, Agent, or Firm* — Perkins Coie LLP (57) ABSTRACT

Methods and systems are provided herein for improved data filtering for use in user interfaces, data visualization, data exploration, and menu operations, which solve the aforementioned problems. Specifically, embodiments disclosed herein relate to improved data structuring for computer devices that provides efficient organization, filtering, and/or navigation in a user interface in order to improve how hierarchical data is displayed and filtered, particularly with regard to small displays or displays of data that aim to be efficient, intuitive, or easy to use.

20 Claims, 10 Drawing Sheets

```
public class LunchPlans
{
public class Sandwich extends LunchPlans                    — 402
{
   public Sandwich (String name)
   {
     super(name);
     System.out.println("Eat Sandwich");
   }
}
                                                            — 404
public class Soup extends LunchPlans
{
   public Soup (String name)
   {
     super(name);
     System.out.println("Eat Soup");
   }
}
```

FIG. 4

```
500
(JSON tree-based dataset)
let lunchPlans = [
        {
                "id": "node_1",                         — 502
                "value": "Eat a sandwich",
                "score": 0.8,
                "children":[
                        {                               — 506
                                id": "node_1_1",
                                "value": "get moldy bread",
                                "score": 0.1,
                                "children":[....]
                        },
                        {                               — 508
                                id": "node_1_2",
                                "value": "put motor oil and trash on bread",
                                "score": 0.1,
                                "children":[....]
                        }
                ]
        },
        {                                               — 504
                "id": "node_2",
                "value": "Eat mayonnaise from jar",
                "score": 0.3,
                "children":[
                        {                               — 510
                                id": "node_2_1",
                                "value": "Get a fresh bottle of mayonnaise from the store",
                                "score": 0.9,
                                "children":[....]
                        }                               — 512
                        node_2_2:{
                                "value": "Dip a clean spoon into the mayonnaise, taking care not to double dip",
                                "score": 0.9,
                                "children":[....]
                        }
                ]
        }
}
```

METHODS AND SYSTEMS FOR CASCADE FILTERING FOR DATA EXPLORATION IN COMPUTER SYSTEMS

CROSS REFERENCE TO RELATED APPLICATIONS

This application claims priority under 35 U.S.C § 119 to U.S. Provisional Application No. 63/012,019, filed on Apr. 17, 2020, which is incorporated herein by reference in its entirety.

FIELD OF THE INVENTION

The invention relates to methods and systems for improved data filtering for use in user interfaces, data visualization, data exploration, and menu operations.

BACKGROUND

In analytical applications, filters have historically been applied uniformly within a dataset (e.g. "show me all records of sales in Maryland over $100"), so that every record can be considered by the filter. However, for a hierarchical tree structure of data, this is not desirable because of the implicit inheritance of value from parent-to-child (i.e., a child node whose parent node does not pass a filter criterion should not be available for consideration by a filter). For example, implicit inheritance is the process of deriving a new class from an existing class such that the new class automatically contains some or all variables of the original class. The new derived class is called a child class, or subclass, whereas the original class is called a parent class. As such, the child class is always at least as specific as its parent class.

In addition, the human-interaction for tree-based filters has not historically allowed for fast and intuitive exploration of the dataset. For example, a hierarchical tree structure of data has a heading (or category) that is displayed while sub-headings (or sub-categories) are opened and closed. A conventional drop-down menu has a menu icon that is displayed while a user views the options under the drop-down menu. However, in many systems additional areas for describing the data shown or otherwise indicating characteristics about the data is not available (e.g., due to screen size limitations). Moreover, even in systems with additional area, the display of additional information may make the user interface less efficient, intuitive or easy to use. Thus, a user has little information about the quality of content of data prior to navigating to it.

SUMMARY

Accordingly, methods and systems are provided herein for improved data filtering for use in user interfaces, data visualization, data exploration, and menu operations, which solve the aforementioned problems. Specifically, embodiments disclosed herein relate to improved data structuring for computer devices that provides efficient organization, filtering, and/or navigation in a user interface in order to improve how hierarchical data is displayed and filtered, particularly with regards to small displays or displays of data that aim to be efficient, intuitive, and/or easy to use. For example, using a filtering mechanism that emphasizes quality of data during navigation as opposed to after navigation, the embodiments herein provide improved functionality for data exploration. As a further benefit, this improved functionality provides an intuitive user interface for devices that indicates the relationship between data without the need for additional on-screen objects that describe its quality.

For example, as related to hierarchical tree structure, conventional menu displays expand along some visual axis (e.g. horizontally, vertically, radially, etc.). That is, as a user selects an item from the tree structure, the system generates a "branch" of the tree. This branch includes a list of items (e.g., objects), each of which may themselves be selectable. Furthermore, in order to indicate the organizational relationships between the items of the branch and the items of the original tree, the items of the branch are offset horizontally, vertically or radially. This process continues as a selection of an item in the branch causes another branch to be presented. For each new branch, the system further offsets the respective list of items further horizontally, vertically or radially. However, in devices with small screens, the branches and/or levels of the hierarchy have limited space to expand in any directions in order to indicate organizational relationships.

Likewise, there is little ability to provide filtering options or icons on-screen that represent available filtering options. Thus, introducing even rudimentary filtering options is not possible. To overcome these technical challenges, a new method for filtering data is described. Specifically, the method allows for data to be filtered in a "cascading" manner in which filtering mechanisms are applied to various levels of a data structure in a systematic manner.

Not only does cascading filtering prove particularly beneficial is small devices, but it also provides a technical advantage in other user interfaces. For example, if underlying data has different levels of quality (e.g., based on reliability, accuracy, precision) assigned by a system, user, and/or plurality of users (e.g., in a crowdsourced fashion), a user navigating the user interface may have no knowledge of the quality, or a way to filter content in the hierarchical tree based on quality at different levels of the hierarchy, prior to expanding the hierarchical tree and/or reviewing the data.

Accordingly, the methods and systems herein provide a novel and unconventional mechanism for filtering data during data exploration and assisting the user while navigating a user interface. In particular, the system retrieves data describing the quality of data corresponding to an object and displaying the object in a user interface based on that quality. The system further provides a mechanism for a user to select that quality. To assist the user while navigating, icons for objects only indicate child objects (e.g., objects corresponding to a child node in a hierarchical tree) when the quality for those child objects meets or exceeds the selected quality. Furthermore, this process may be iterative, meaning that the system automatically determines and displays icons indicating that child objects are available down each branch of the tree.

Moreover, the methods and systems provide a cascading effect as quality thresholds are checked at each level of the hierarchical tree. To provide this cascading effect, the system may access a data structure comprising metadata related to nodes in a hierarchical tree and a quality metric for each of these nodes. The system may then compare the quality of a parent node to a quality threshold. If the quality threshold is met, the system may then determine child nodes, retrieve quality metrics for the child node, and/or determine whether the child nodes meet the quality metric. If so, the system may generate for display an object corresponding to the parent node and/or indicate that the parent node has a child node that also meets the threshold. In contrast, parent nodes that do not meet the quality threshold, even if their child nodes do, are filtered out.

In one aspect, methods and systems for cascade filtering for data exploration in computer systems are described. For example, the system may generate for display, in a user interface, a first object corresponding to a first node in a hierarchical tree. The system may receive a first user input selecting a first quality threshold. The system may determine a first child node for the first node. The system may determine a first quality of the first child node. The system may compare the first quality to the first quality threshold. The system may, in response to determining that the first quality meets or exceeds the first quality threshold, modify the first object, in the user interface, to indicate that the first node has the first child node in the hierarchical tree.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
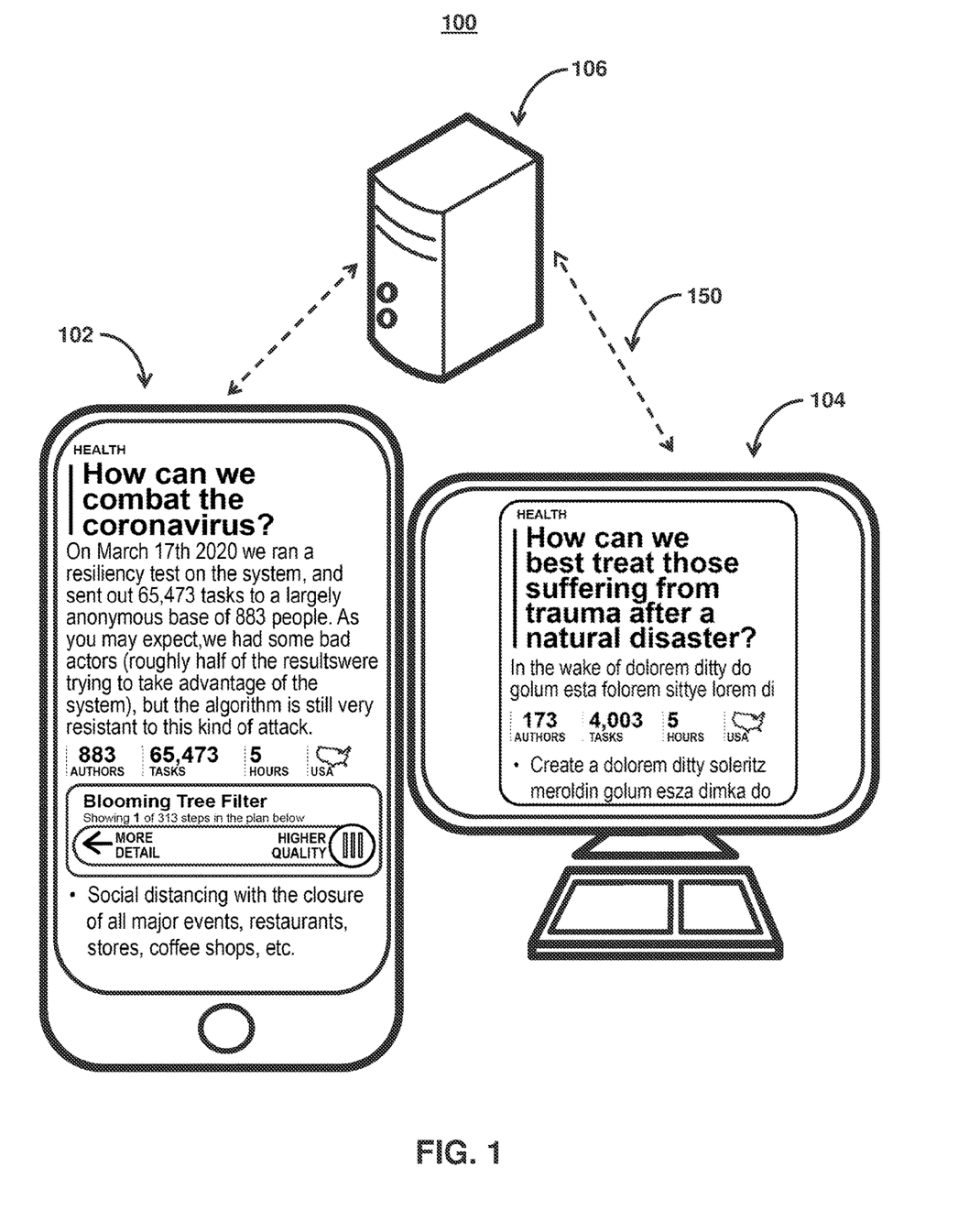
FIG. 1 shows an illustrative system for cascade filtering for data exploration in computer systems, in accordance with one or more embodiments.

As shown in FIG. 1, system 100 may include mobile device 102 and user terminal 104. While shown as a smartphone and personal computer, respectively, in FIG. 1, it should be noted that mobile device 102 and user terminal 104 may be any computing device, including, but not limited to, a laptop computer, a tablet computer, a hand-held computer, other computer equipment (e.g., a server), including "smart," wireless, wearable, and/or mobile devices. FIG. 1 also includes server 106. Server 106 may alternatively be any computing device as described above and may include any type of mobile terminal, fixed terminal, or other device. It should also be noted that system 100 is not limited to three devices. Users may, for instance, utilize one or more other devices to interact with one another, one or more servers, or other components of system 100. It should be noted that, while one or more operations are described herein as being performed by particular components of system 100, those operations may, in some embodiments, be performed by other components of system 100. As an example, while one or more operations are described herein as being performed by components of user terminal 104, those operations may, in some embodiments, be performed by components of server 106. In some embodiments, the various computers and systems described herein may include one or more computing devices that are programmed to perform the described functions.

Users may interact with the system using a user interface. As referred to herein, a "user interface" may comprise a human-computer interaction and communication in a device, and may include display screens, keyboards, a mouse, and the appearance of a desktop. For example, a user interface may comprise a way a user interacts with an application or a website. As referred to herein, "data" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Data may be recorded, played, displayed, or accessed by user equipment devices, but can also be part of a live performance. In some embodiments, data may include a text string.

In some embodiments, the user interface may comprise a graphical display that allows a user to interact with and/or perform filtering operations on a data structure. The graphical display may include a plurality of objects, each of which may have corresponding characteristics. An object's characteristics may comprise any characteristics that distinguishes one object from another. For example, an object characteristic may be media-related information (e.g., ordering, heading information, titles, descriptions, ratings information (e.g., parental control ratings, critic's ratings, etc.), source code data (e.g., HTML, source code headers, etc.), genre or category information, subject matter information, author/actor information, logo data, or other identifiers for the content provider), media format, file type, object type, objects appearing in the content (e.g., product placements, advertisements, keywords, context), or any other suitable information used to distinguish one object from another. In some embodiments, the object characteristic may also be human-readable text.

In some embodiments, the system may use object characteristics to automatically display recommendations of objects. For example, the system may use the object characteristic to determine whether an object is of interest to the user based on a comparison of the object characteristic and user profile data for the user. In some embodiments, an object characteristic may include information that describes the object and/or is stored with the object. For example, an object may correspond to a title or header that describes information that is generated for display as a user selects an object.

In some embodiments, the system may parse the contents of object characteristics (e.g., information to which the object relates) and metadata describing the characteristic. For example, the metadata may indicate a context of the characteristic, and the characteristic may comprise human-readable text.

Each object may be linked to other objects in the data structure through a series of nodes. For example, a tree structure or tree diagram is a way of representing the hierarchical nature of a data structure in a graphical form. The tree elements are called "nodes". The lines connecting elements are called "branches". The names of relationships between nodes may model the kinship terminology of family relations. For example, a node's "parent" is a node one step higher in the hierarchy (i.e. closer to the root node) and lying on the same branch. A node's "child" is a node one step lower in the hierarchy (i.e. further from the root node) and lying on a branch originating from the parent. A "sibling" node shares the same parent node. It should be noted that as described herein embodiments may feature tree structures comprising nested sets, radial trees, etc.

With respect to the components of mobile device 102, user terminal 104, and server 106, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing circuitry. Each of these devices may also include a user input interface and/or user output interface (e.g., a display) for use in receiving and displaying data. For example, as shown in FIG. 1, both mobile device 102 and user terminal 104 include a display upon which to display data. In some embodiments, FIGS. 2A-E may be displayed on mobile device 102 and/or user terminal 104. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 100 may run an application (or another suitable program). The application may cause the processors and/or control circuitry to perform operations related to the verification service (e.g., either transmitting verification requests, receiving verification requests, and/or processing verification requests). For example, the processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein. The electronic storage may be used to store a database listing a hierarchical tree for the first object and relationships between objects and tree nodes in the hierarchical tree.

In some embodiments, an application that generates a user interface that provides cascade filtering for data exploration in computer systems may be implemented in an API layer on one or more devices in FIG. 1. For example, system 100 also includes API layer 150. In some embodiments, API layer 150 may be implemented on user device 322 or user terminal 324. Alternatively or additionally, API layer 150 may reside on one or more of cloud components 310. API layer 150 (which may be A REST or Web services API layer) may provide a decoupled interface to data and/or functionality of one or more applications. API layer 150 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in enterprise for publishing internal services, as well as for exchanging information with partners in B2B transactions.

API layer 150 may use various architectural arrangements. For example, system 100 may be partially based on API layer 150, such that there is strong adoption of SOAP and RESTful Web-services, using resources like Service Repository and Developer Portal, but with low governance, standardization, and separation of concerns. Alternatively, system 100 may be fully based on API layer 150, such that separation of concerns between layers like API layer 150, services, and applications are in place.

In some embodiments, the system architecture may use a microservice approach. Such systems may use two types of layers: Front-End Layer and Back-End Layer where microservices reside, in this kind of architecture, the role of the API layer 150 may provide integration between Front-End and Back-End. In such cases, API layer 150 may use RESTful APIs (exposition to front-end or even communication between microservices). API layer 150 may use AMQP (e.g., Kafka, RabbitMQ, etc.). API layer 150 may use incipient usage of new communications protocols such as gRPC, Thrift, etc.

In some embodiments, the system architecture may use an open API approach. In such cases, API layer 150 may use commercial or open source API Platforms and their modules. API layer 150 may use developer portal. API layer 150 may use strong security constraints applying WAF and DDoS protection, and API layer 150 may use RESTful APIs as standard for external integration.

Figure 2A:
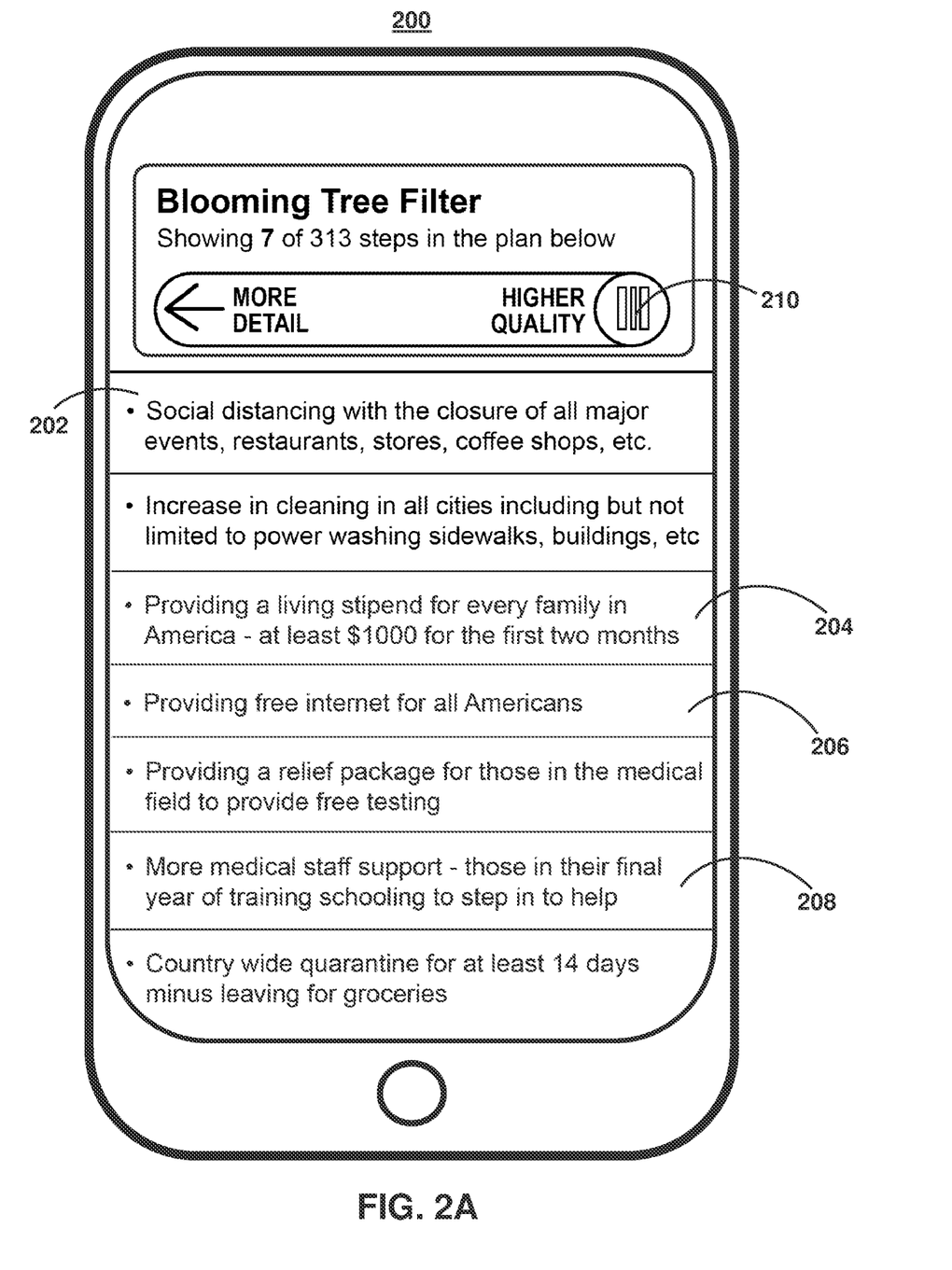
FIGS. 2A-2E respectively show illustrative examples for cascade filtering for data exploration in computer systems, in accordance with one or more embodiments.
Figure 2B:
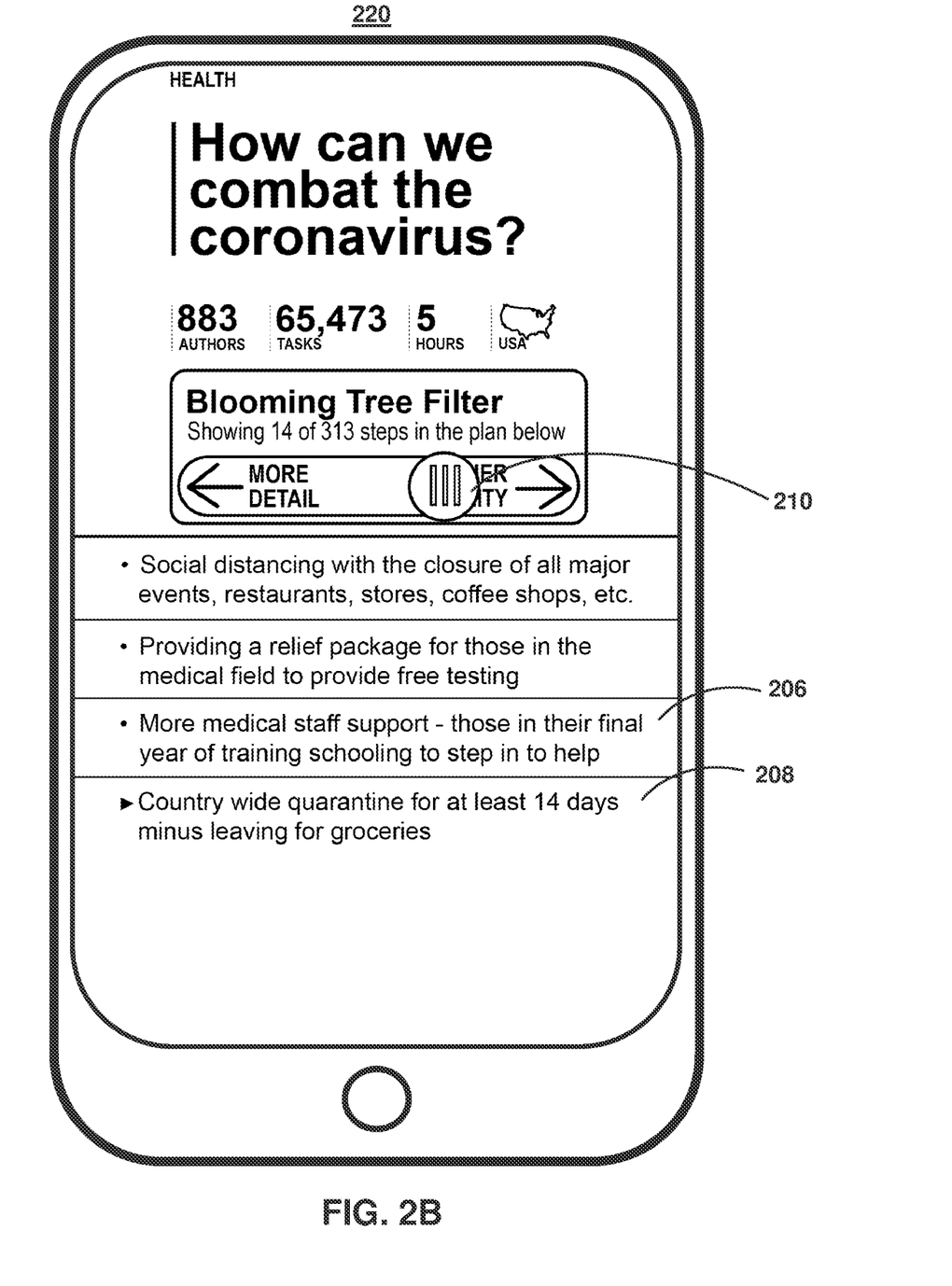
Figure 2C:
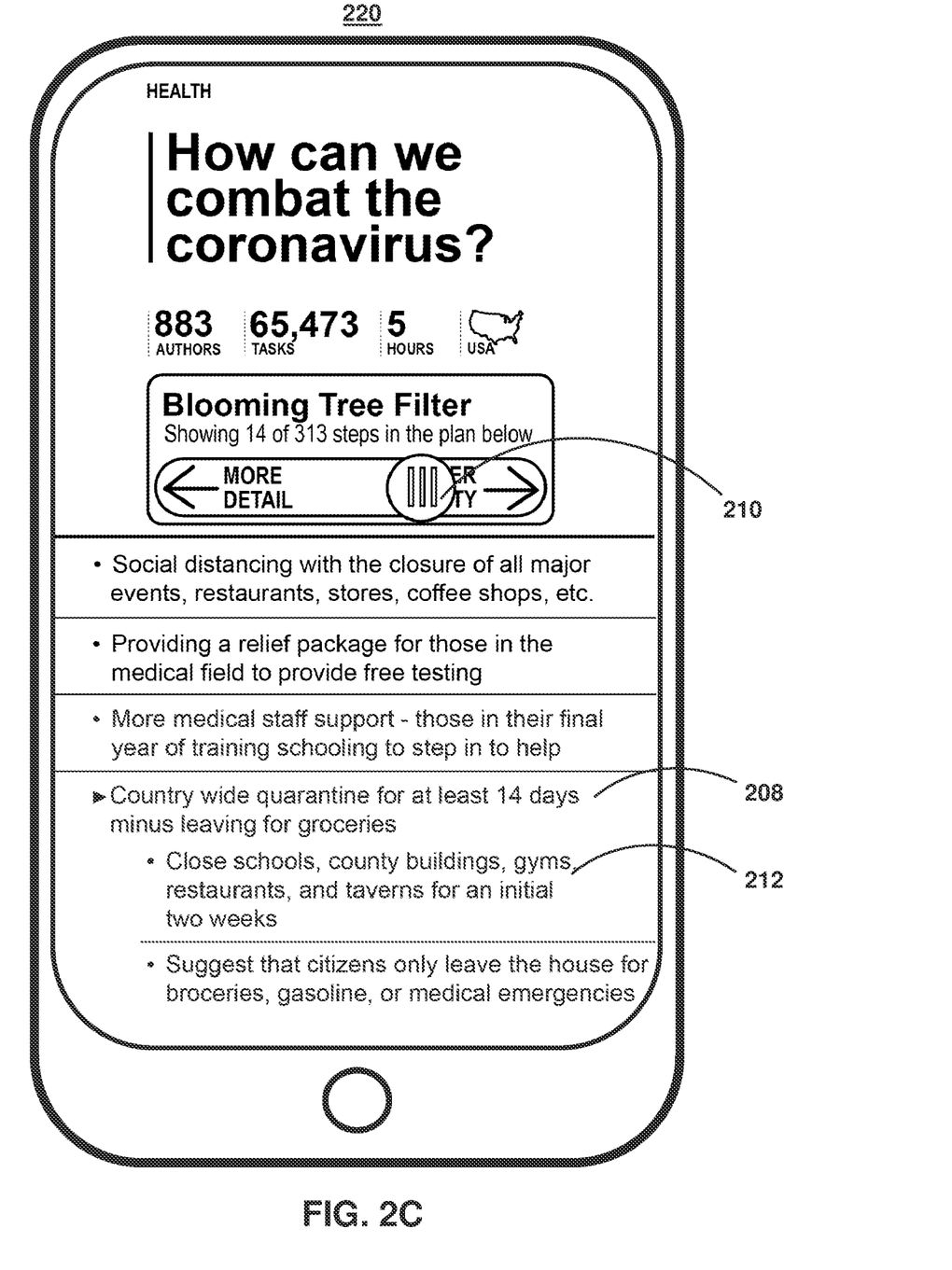

FIGS. 2A-2E respectively show an illustrative example of improvements to user interfaces and menu operations, in accordance with one or more embodiments. For example, FIG. 2A shows user interface 200 as a user navigates through pluralities of objects (i.e., objects 204, 206, and 208). In FIGS. 2A-2C the pluralities of objects are shown as objects in nested lists. In some embodiments, user interface 200 may be a portable electronic device (e.g., mobile device 102 (FIG. 1)). User interface 200 is currently displaying first plurality of objects 202. As shown in FIG. 2A, first plurality of objects 202 may be structured as a list of items or a menu of selectable icons. First plurality of objects 202 includes objects 204, 206, and 208. Notably, the user interface style shown shown in FIGS. 2A-2E is for illustrative purposes. For example, FIG. 2A shows an example of a full screen embodiment without a header, whereas FIG. 2B shows a partial screen embodiment with a larger header section of the user interface.

FIG. 2A also includes icon 210 on a track bar in user interface 200. Icon 210 may indicate scroll position on a track bar indicative of a current level of quality associated with the plurality of objects 202. In some embodiments, icon 210 may comprise one or more graphical elements that may also transition from one quality to another as a user progresses through different qualities. For example, as shown in FIG. 2A icon 210 may move along a track that includes markings that represent different quality levels. By moving along the track, icon 210 may reveal additional objects (e.g., corresponding to child nodes of objects 204, 206, and 208 that meet the quality selected by icon 210) as shown in FIGS. 2B and C.

As referred to herein, "quality" may include any quantitative (e.g., numerical rating) or qualitative assessment (e.g., a textual description) of an object. For example, the system may determine a quality of each object in a data structure (e.g., a data structure corresponding to a hierarchical tree). The quality may be assigned by a central source, system, industry metric, user, and/or group of users (e.g., via crowdsourcing). This process may be done manually through user review and input and/or may be done automatically through the use of one or more automated systems involving machine learning, web scraping, crowdsourcing, and/or data processing or data analytics.

In some embodiments, the quality of an object may be based on crowdsourced information. For example, the quality of an object may correspond to a number of users that have contributed to information about the object. Alternatively or additionally, the quality of an object may correspond to a number of users that have agreed with (e.g., up voted) the object. Alternatively or additionally, the quality of an object may correspond to a number of votes for the object. Alternatively or additionally, the quality of an object may correspond to a number of views of the object (e.g., over a given time period).

In some embodiments, the quality of an object may be based on information about an author or source of the information related to the object. For example, the quality of an object may correspond to a number of users that have cited a source of information related to the object. Alternatively or additionally, the quality of an object may correspond to a ranking (e.g., a peer review, professional, and/or other ranking) of a contributor, source, and/or author corresponding to the information related to the object.

In some embodiments, the quality of an object may be based on a frequency at which information related to the object is updated. For example, the quality of an object may correspond to a number of days since the information related to the object was updated. Alternatively or additionally, the quality of an object may correspond to a frequency and/or rate of change of the frequency over a given time period at which the information related to the object is updated.

In some embodiments, the quality of an object may be based on an algorithm (e.g., a machine learning model) that performs a multivariate analysis of one or more characteristics about an object (e.g., crowdsource information, source information update frequency, etc.) to determine a ranking. For example, the system may generate a feature input for the characteristics of the object. The feature input may then be processed through a machine learning model that is trained to generate a quality of the object. Based on the output of the machine learning model, the system may assign a quality.

In each case, the system may continuously and/or at a predetermined time update the quality for each object in the data structure. In some embodiments, the system may prefetch data about the quality for recently viewed objects and may update the quality as a user interface with a user interface featuring the objects. For example, the system may automatically transmit a request for updated quality metrics upon a user launching an application. Additionally or alternatively, the system may ping a remote source for updates to the quality metrics as a user interacts with a user interface.

In some embodiments, icon 210 may include additional textual, graphical, and/or audio components that indicate a quality of a currently displayed plurality of objects. In any of these embodiments, the system may select an icon (e.g., from a plurality of icons) and/or a component of an icon based on a current quality level in the hierarchical tree data structure. It should also be noted that in some embodiments, each object in first plurality of objects 202 may not be selectable until the system reveals child nodes (e.g., in response to determining that a child node corresponds to an object with a selected level of quality). Moreover, the system may require branches in the hierarchical tree data structure to have a continuous pathway of nodes that meet the quality level. For example, the system may not present a grandchild node of a node corresponding to object 204 because no child node meets the selected quality level—even if that grandchild node has a superior quality value. Alternatively, the system may include the grandchild node and/or the child node may be selected based on its relationship to the grandchild, but only if its parent also has a passing quality value.

For example, in response to a user selection of object 208, the system may generate and/or reveal additional objects if these objects meet the selected quality. However, in some embodiments, one or more objects in first plurality of objects 202 may not be selectable. In response to a user selection of object 206, the system may not generate and/or reveal additional objects. In some embodiments, the system may generate a user alert that there are no additional objects corresponding to a given object and/or the object (or icon associated with the object) may appear with a different graphical feature (e.g., color, symbol, and/or other distinction) to indicate this fact.

In FIG. 2B, the system has received a user input selecting a lower quality as shown by the position of icon 210 on the track bar in user interface 220. For example, the system may have received a user input via a touchscreen interface of user interface 220. It should be noted that the system may receive user inputs through one or more means including a remote control, mouse, trackball, keypad, keyboard, touch screen, touchpad, stylus input, joystick, voice recognition interface, and/or other user input interfaces. Additionally or alternatively, the system may receive a gesture input. As referred to herein, the term "gesture" should be understood to include a movement of one or more portions of a user's body part (e.g., finger, hand, face, etc.), across an input device and/or interface.

In some embodiments, the system may distinguish between a "tap" input (e.g., a keyboard entry, a mouse click, a "tap" on a touchscreen, etc.) and a gesture input. For example, in response to a tap input, the system may select a first transition graphic to perform (and/or one or more plurality of objects to perform the first transition graphic on). In response to a gesture input, the system may select a second transition graphic to perform (and/or one or more plurality of objects to perform the second transition graphic on).

In response to detecting the lower quality, the system has compared the quality of additional objects. For example, the system may traverse down the tree in an efficient way, so that if a parent node does not meet the quality criteria, then the children will not be considered as well. These objects may include objects that correspond to child nodes of the nodes of the plurality of objects 202.

For example, in response to receiving, using control circuitry, a user input selecting a first quality (e.g., as shown by the position of icon 210), the system may determine a first child node (e.g., corresponding to object 212 (FIG. 2C)) for a first node (e.g., corresponding to object 208). The system may then compare the first quality to a first respective quality of the first child node. For example, the system may retrieve (e.g., using a lookup table database or other data structure) metadata for a quality assigned to the object and/or node.

In response to determining that the first respective quality meets or exceeds the first quality, the system may modify the first object, in the user interface, to indicate that the first node has the first child node in the hierarchical tree. For example, as shown in FIG. 2B, object 208 now includes a bolded, darkened, arrow symbol. These visual characteristics indicate the change of status of object 208. That is, object 208 is now selectable and/or is now indicated to have available child objects (e.g., objects that meet the selected quality).

In contrast, the system may not modify objects and/or reveal child objects if the system determines that child objects and/or node do not meet the selected quality. For example, in response to receiving, using control circuitry, the user input selecting a first quality (e.g., as shown by the position of icon 210), the system may determine a second child node (not shown) for a second node (e.g., corresponding to object 206). The system may then compare the first quality to a second respective quality of the second child node. For example, the system may retrieve (e.g., using a lookup table database or other data structure) metadata for a quality assigned to the object and/or node.

In response to determining that the second respective quality does not meet or exceed the first quality, the system may not modify the second object (e.g., object 206), in the user interface, to indicate that the second node has a second child node in the hierarchical tree. For example, as shown in FIG. 2B, object 206 does not include a bolded, darkened, arrow symbol. Through the use of the previous visual characteristics, the system indicates that there is no change to the status of object 206. That is, object 206 is still not selectable and/or is not indicated to have available child objects (e.g., objects that meet the selected quality).

As shown in FIG. 2C, the system may also receive a subsequent user input selecting a selectable object (e.g., object 208). For example, the system may receive a second user input selecting the first object (e.g., object 208). In response to receiving the second user input selecting the first object, the system may generate for display a third object (e.g., object 212), in user interface 220, that corresponds to the first child node in the hierarchical tree.

Figure 2D:
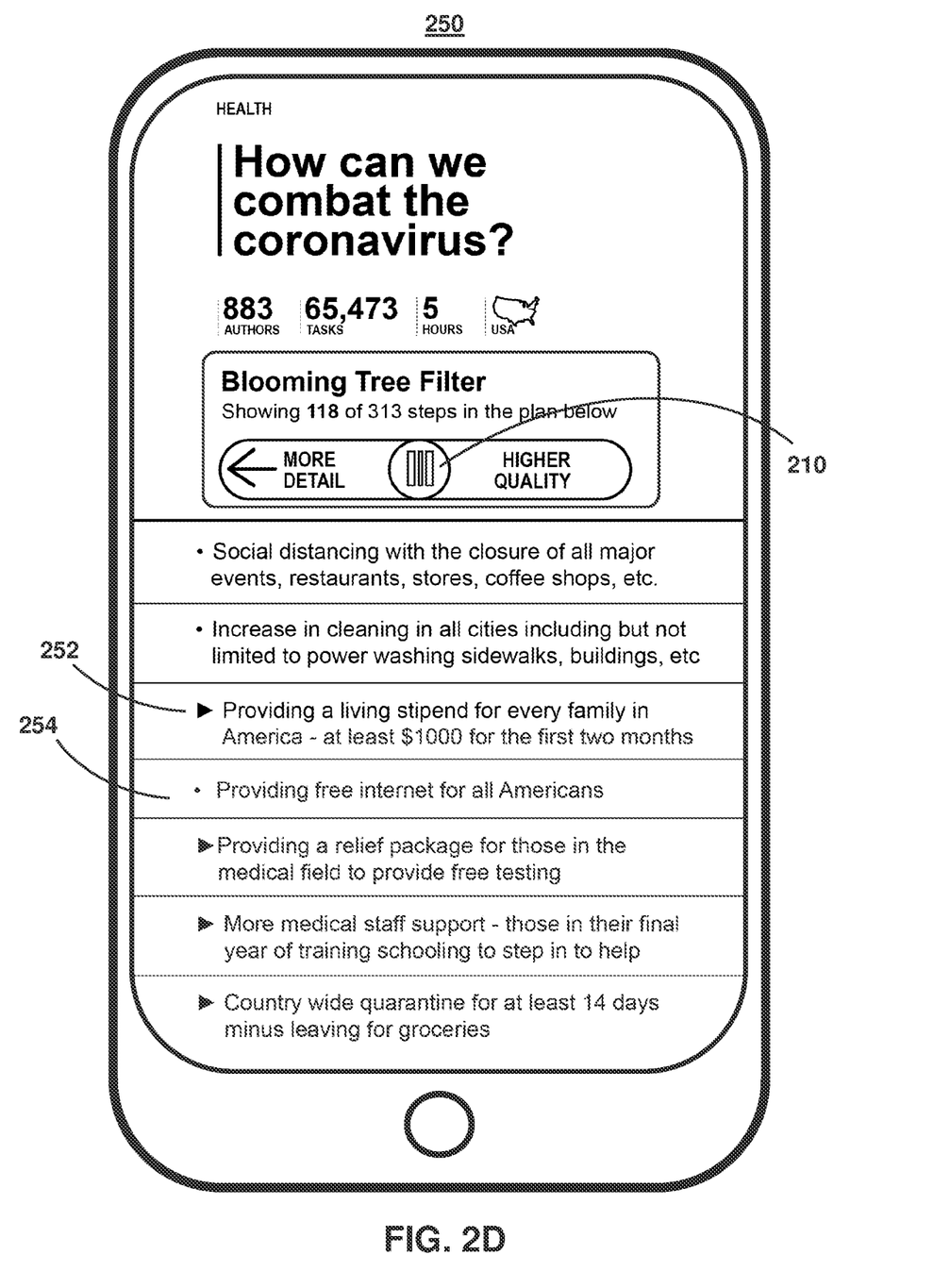

FIG. 2D also includes icon 210 on a track bar. As discussed previously icon 210 may indicate scroll position on a track bar indicative of a current level of quality associated with the plurality of objects. For example, the track bar may provide options of displaying objects associated with a higher quality versus a more detailed hierarchal structure. For example, as shown in FIG. 2D icon 210 may move along a track that includes markings that represent different quality levels. Currently, icon 210 is situated at a midpoint on the track bar indicating a balance between additional details and lower quality. By moving along the track, icon 210 may reveal additional objects and/or obfuscate additional objects.

For example, as shown in FIG. 2D, user interface 250 currently shows object 252 and object 254. Object 252 is currently graphically accentuated in order to indicate that object 252 may be selected to reveal additional objects. In contrast, object 254 is not graphically accentuated in order to indicate that it is not selectable to reveal additional objects. For example, object 252 may correspond to a parent node that has a quality above the current selected (e.g., via icon 210) threshold quality and/or has a child node having a quality above the threshold quality. In contrast, object 254 may correspond to a parent node that does not have a quality above the current selected threshold quality and/or has a child node that does not have a quality above the threshold quality.

As used herein, "graphically accentuate" may include any change in visual characteristics of a graphic representation (e.g., of an icon, user interface, and/or object) that visually distinguishes the graphic representation. For example, the system may graphically accentuate a graphic representation (or portion thereof) of object 252 by altering the size, shape, color, animation, or otherwise visually distinguishing the graphic representation. As an illustrative example, the system may increase the size of the graphic representation by 50%, change the text to bold, and/or change a bullet style for object 252 in user interface 250.

The system may determine whether or not to graphically accentuate an object and/or determine a level or degree to which to graphically accentuate an object (or a portion thereof) based on a quality of the object and/or child objects of the object. For example, the system may determine whether or not the object and/or child objects meet a threshold quality. If so, the system may graphically accentuate an object.

Figure 2E:
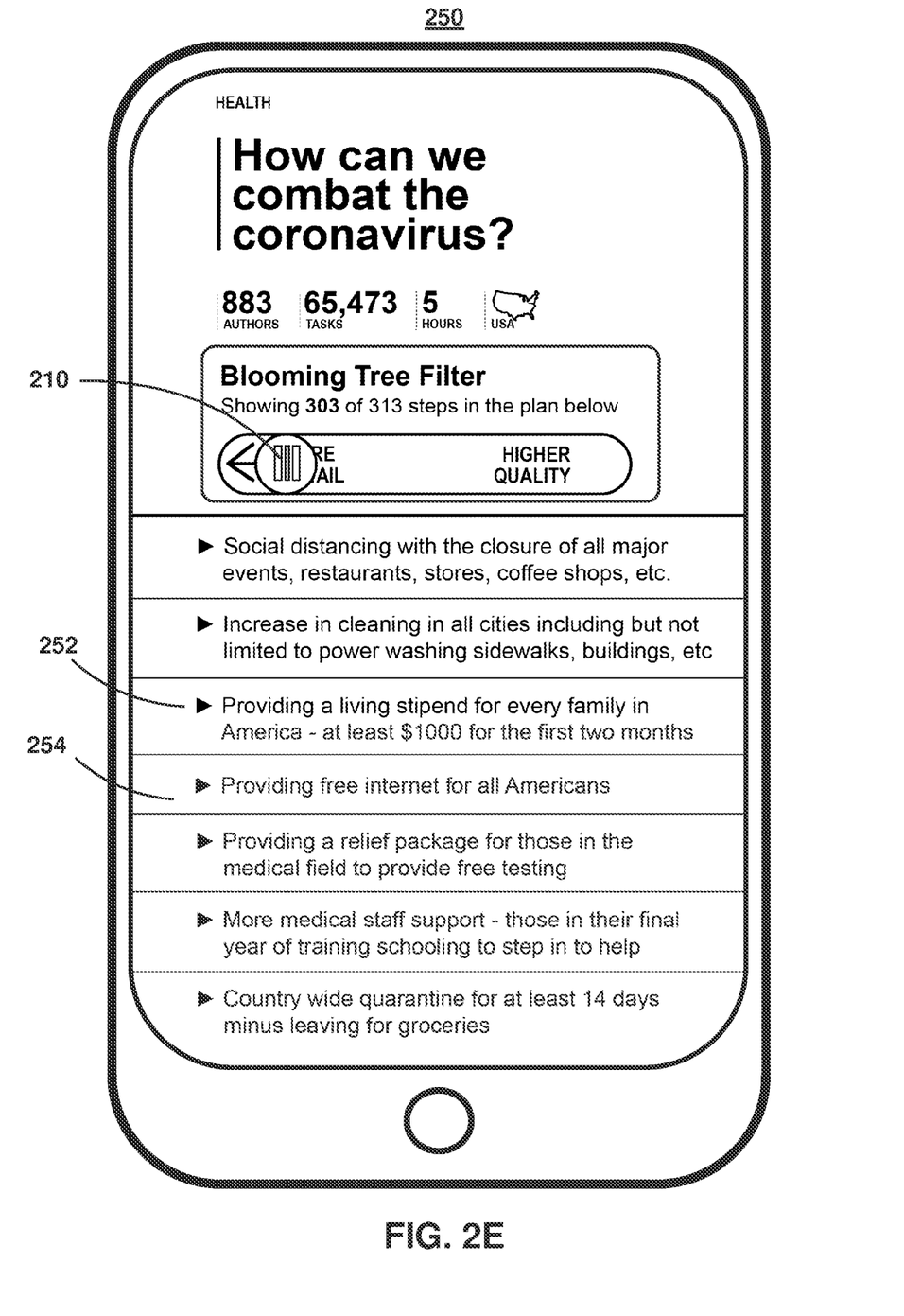

For example, as shown in FIG. 2E, the system has received a user input (e.g., an adjustment to icon 210) that has lowered a threshold quality (e.g., in favor of a more detailed view of the data structure). In response, the system has graphically accentuated object 254 (as well as object 252) to indicate that object 254 may correspond to a parent node that has a quality above the current selected (e.g., via icon 210) threshold quality and/or has a child node having a quality above the threshold quality. For example, the system may adjust the number of objects that are displayed (e.g., in user interface 250) and/or are selectable (e.g., in user interface 250) based on adjustments and/or user inputs (e.g., to icon 210) as shown in FIG. 3.

Figure 3:
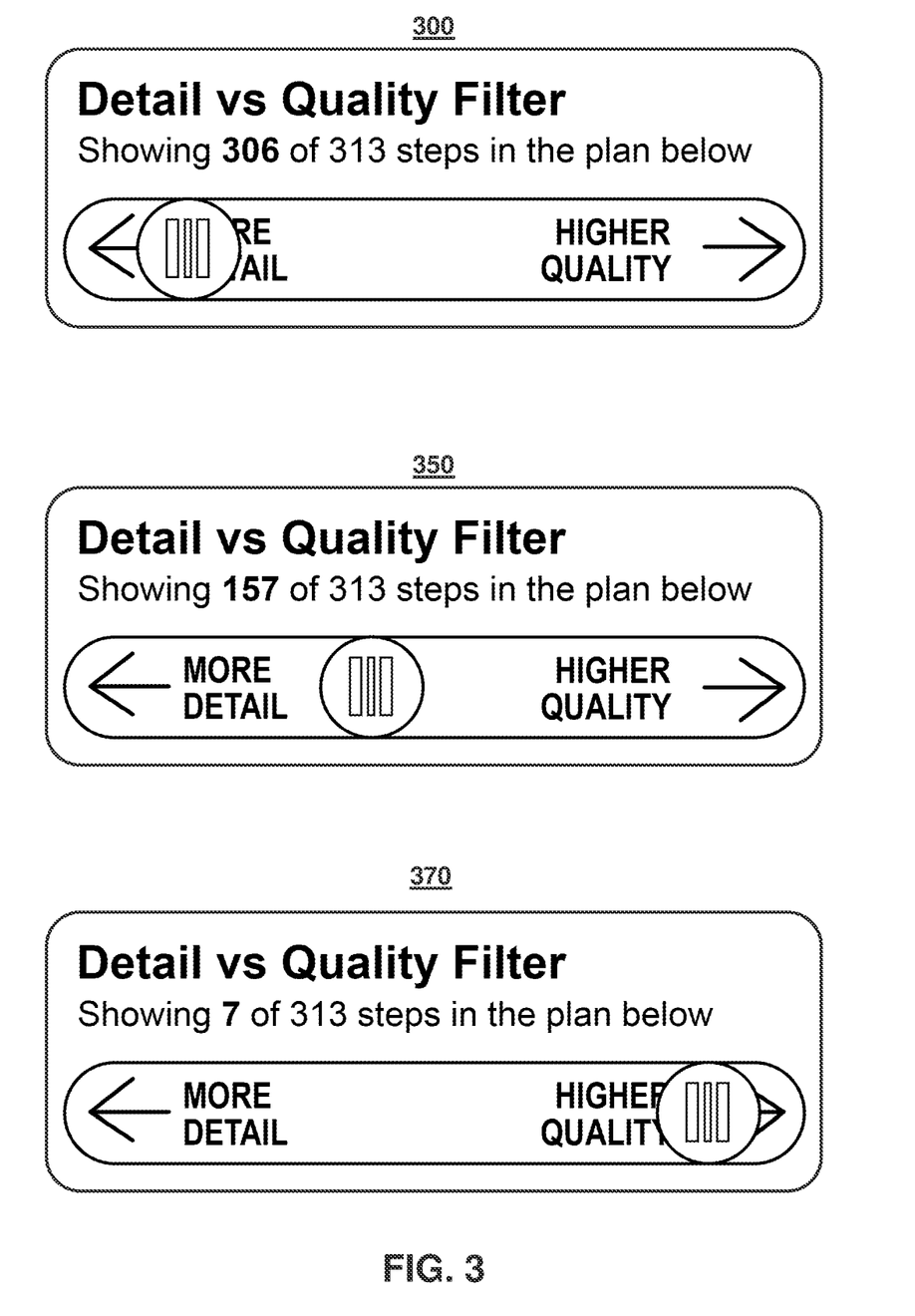
FIG. 3 shows an illustrative example of an icon sliding on a track bar to set quality thresholds, in accordance with one or more embodiments.

FIG. 3 shows an illustrative example of an icon sliding on a track bar to set quality thresholds, in accordance with one or more embodiments. For example, FIG. 3 displays user interface 300, user interface 350, and user interface 370.

User interface 300 shows an example where a user input has selected a more detailed view of available objects. In particular, as described by user interface 300, "306 of 313" objects are presented. For example, for three hundred and six objects, the system has determined that a parent node has a quality above the current selected threshold quality and/or has a child node having a quality above the threshold quality. In contrast, for seven objects, the system has determined that a parent node does not have a quality above the current selected threshold quality and/or does not have a child node having a quality above the threshold quality.

User interface 350 shows an example where a user input has selected a more detailed view of available objects. In particular, as described by user interface 300, "157 of 313" objects are presented. For example, for one hundred and fifty-seven objects, the system has determined that a parent node has a quality above the current selected threshold quality and/or has a child node having a quality above the threshold quality. In contrast, for one hundred and fifty-six objects, the system has determined that a parent node does not have a quality above the current selected threshold quality and/or does not have a child node having a quality above the threshold quality.

User interface 370 shows an example where a user input has selected a more detailed view of available objects. In particular, as described by user interface 300, "7 of 313" objects are presented. For example, for seven objects, the system has determined that a parent node has a quality above the current selected threshold quality and/or has a child node having a quality above the threshold quality. In contrast, for three hundred and six objects, the system has determined that a parent node does not have a quality above the current selected threshold quality and/or does not have a child node having a quality above the threshold quality.

Figure 4:
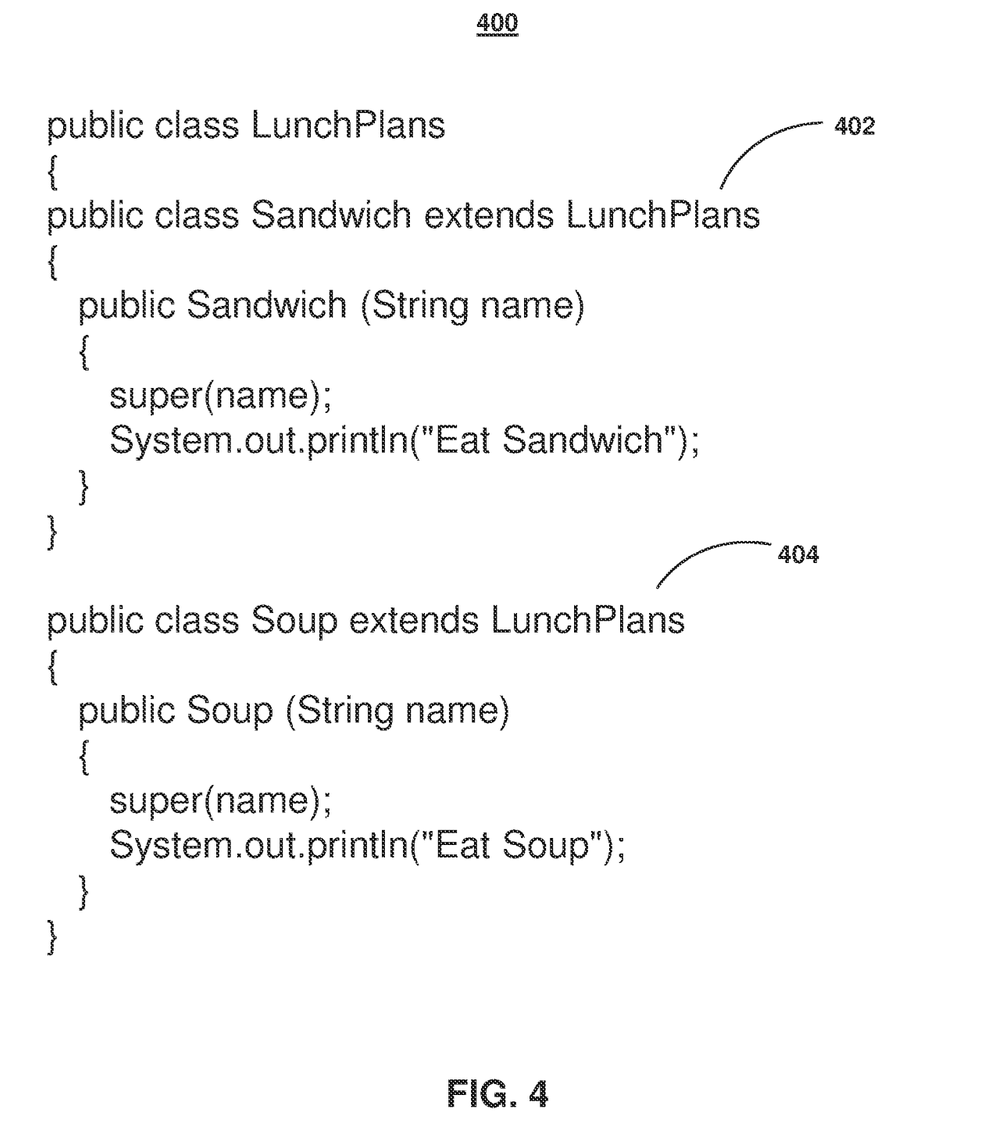
FIG. 4 shows an example of pseudocode that does not provide for cascade filtering for data exploration in computer systems, in accordance with one or more embodiments.

FIG. 4 shows an example of pseudocode that does not provide for cascade filtering for data exploration in computer systems, in accordance with one or more embodiments. For example, in some embodiments, in order to provide cascade filtering, the system may retrieve quality metrics for objects and/or nodes in a data structure. In some embodiments, the system may access a database to retrieve quality metrics and/or retrieve quality metrics from the source code of an application. For example, pseudocode 400, which may correspond to conventional source code, does not include quality metrics and/or functions used to retrieve quality metrics.

Figure 5:
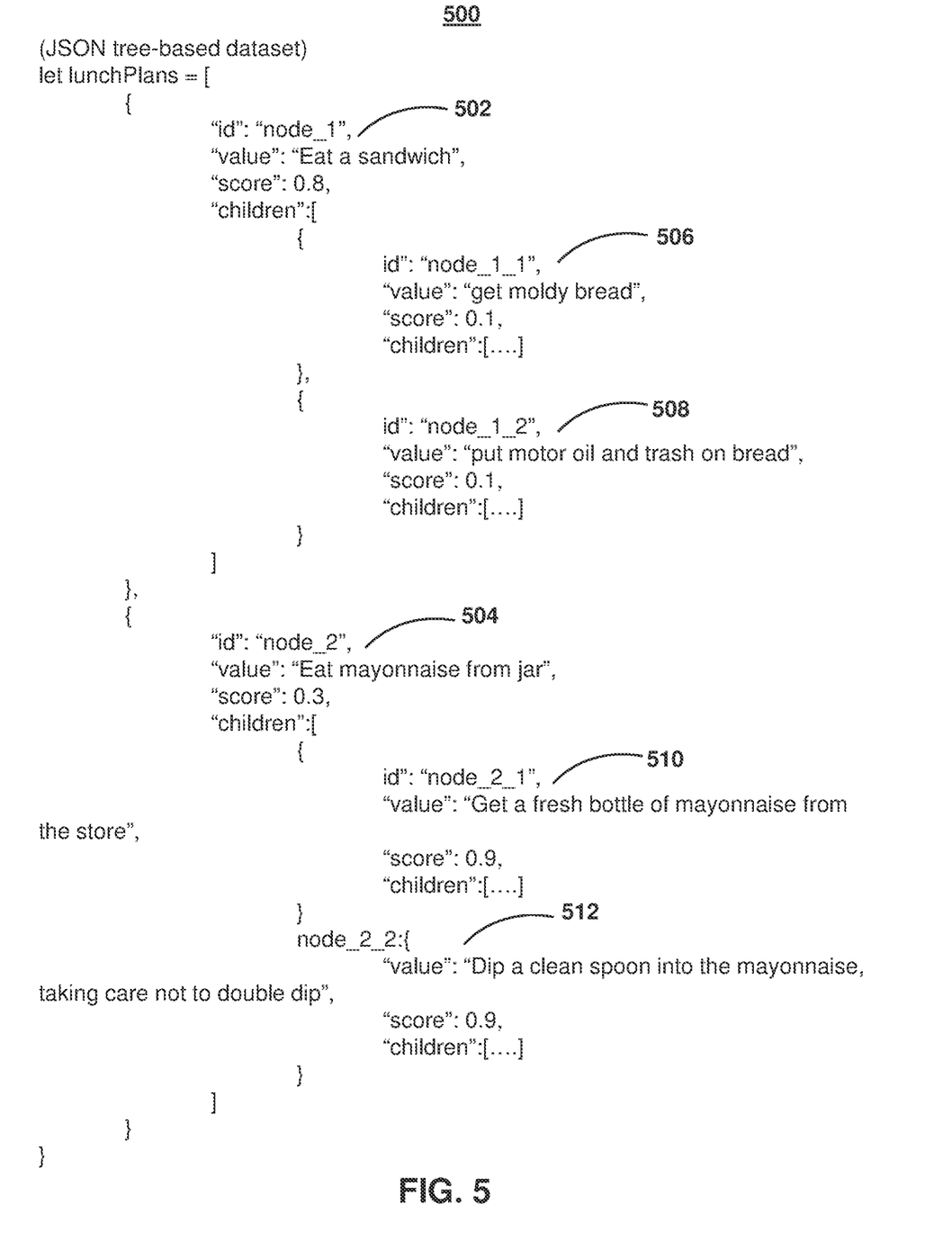
FIG. 5 shows an example of pseudocode that provides for cascade filtering for data exploration in computer systems, in accordance with one or more embodiments.

In contrast, FIG. 5 shows an example of pseudocode that provides for cascade filtering for data exploration in computer systems, in accordance with one or more embodiments. For example, pseudocode 500 includes portions 502-512, which correspond to nodes/objects in a data structure. The system may use pseudocode 500 to perform cascade filtering such that objects that correspond to parent nodes that have a quality above the current selected threshold quality and/or have child nodes that have a quality above the threshold quality are generated for display and/or selectable in a user interface (e.g., user interface 200 (FIG. 2A)). The system may also use pseudocode 500 to perform cascade filtering such that parent nodes that do not have a quality above the current selected threshold quality and/or child nodes that do not have a quality above the threshold quality are generated for display and/or are selectable in a user interface (e.g., user interface 200 (FIG. 2A)).

For example, pseudocode 500 may correspond to a tree-based dataset which represents lunch plans. For example, each portion of pseudocode 500 (as shown in FIG. 5) may correspond to a different node and/or an object. For example, portion 502 may correspond to a first node (e.g., identified by node identifier "node_1"). The first node may have an object (e.g., a graphic representation and/or other content) that corresponds to the message "Eat a sandwich." The first node may also have a quality expressed as a "score" of "0.8". Node 1 may also include a list of child nodes and/or other information about its family (e.g., parent nodes, child nodes, and/or sibling nodes). In some embodiments additional and/or alternative information may also be present.

The system uses the information in portion 502 as well as the information in other portions to provide the cascade filtering. For example, the system may determine that node_1 (e.g., corresponding to portion 502), "Eat a sandwich," has a score of 0.8. The system may also determine that node_2 (e.g., corresponding to portion 504), "Eat mayonnaise from the jar," has a score of 0.3. However, the system may also determine that the child nodes of node 1 both have scores of 0.1, while the child nodes of node 2 are both 0.9.

If the system were to filter on the "score" value using a conventional filter (e.g., a non-cascading filter) and used the quality threshold of 0.5, the system would generate node 1 (e.g., corresponding to portion 502), node_2_1 (e.g., corresponding to portion 510), and node_2_2 (e.g., corresponding to portion 512). As node_2_1 and node_2_2 are descendants of the poorly rated node_2, the presentation of these nodes (or their corresponding objects) is not desirable.

In contrast, using a filter that cascades through the tree, where children are first filtered through the values of the parents, gives a better result. For example, using a cascading filter, in response to a quality threshold of "score" values above 0.5 (e.g., as set by icon 210 (FIG. 2A)), the system would return only node_1. Similarly, in response to a quality threshold of "score" values above 0.25, the system would return node_1, node_2, node_2_1 and node_2_2.

Figure 6:
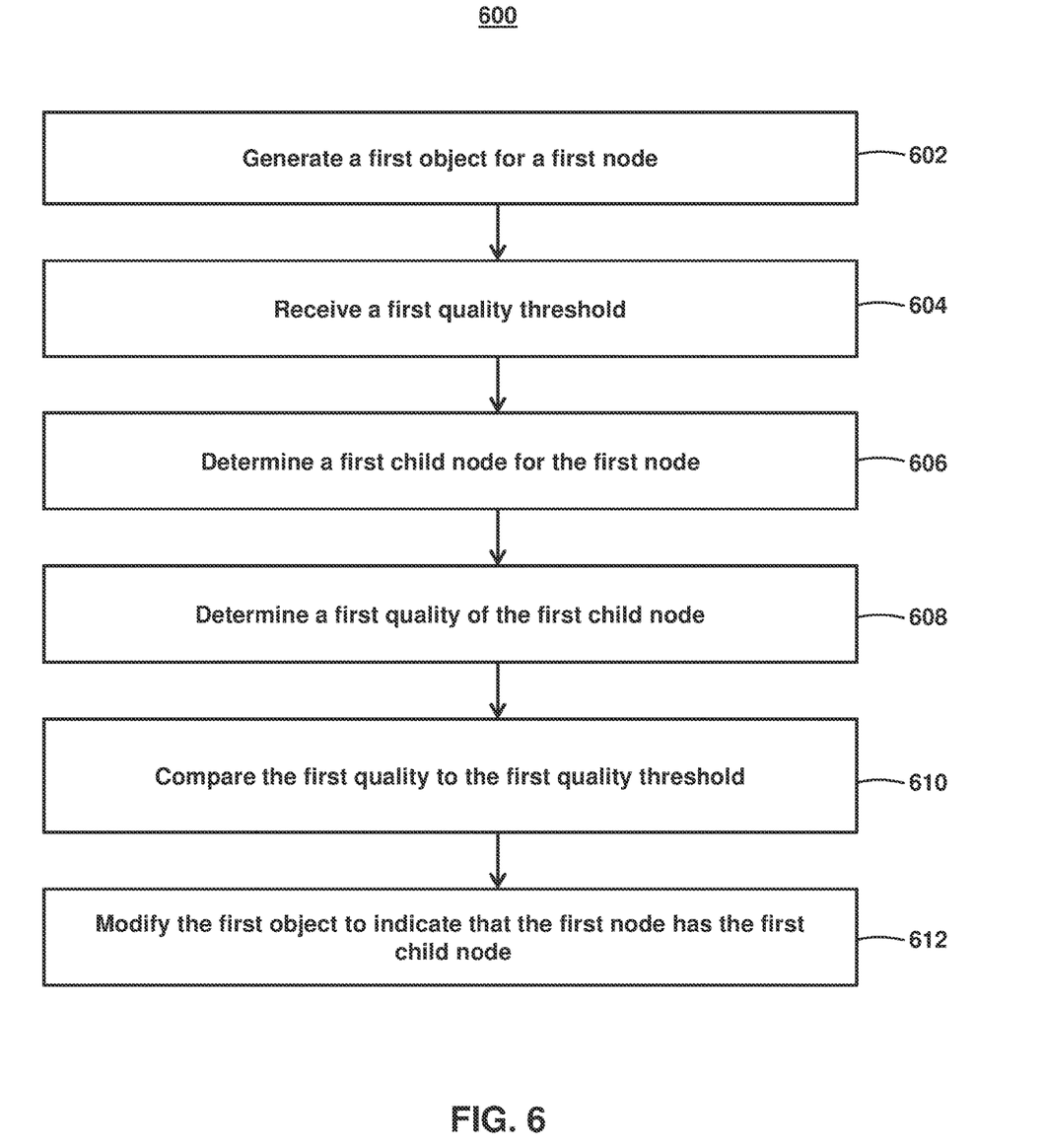
FIG. 6 shows a flowchart for steps involved in providing cascade filtering for data exploration in computer systems, in accordance with one or more embodiments.

FIG. 6 shows a flowchart for steps involved in providing cascade filtering for data exploration in computer systems, in accordance with one or more embodiments. For example, the system may use process 600 to provide cascading filters to generate the user interfaces as described herein (e.g., FIGS. 2A-E).

At step 602, process 600 (e.g., using one or more components described in system 100 (FIG. 1)) generates a first object for a first node. For example, the system may generate for display, in a user interface, a first object corresponding to a first node in a hierarchical tree. For example, the hierarchical tree may be based on a data structure. In some embodiments, the system may access the data structure comprising metadata related to nodes in the hierarchical tree. The system may determine a record in the data structure corresponding to the first quality. The system may then retrieve the first quality from the record.

At step 604, process 600 (e.g., using one or more components described in system 100 (FIG. 1)) receives a first quality threshold. For example, the system may receive a first user input selecting a first quality threshold. In some embodiments, the first user input may be received via a user modifying a position of an icon on a track bar (e.g., as described in FIG. 3).

At step 606, process 600 (e.g., using one or more components described in system 100 (FIG. 1)) determines a first child node for the first node. For example, the system may determine a first child node for the first node.

At step 608, process 600 (e.g., using one or more components described in system 100 (FIG. 1)) determines a first quality of the first child node. For example, the system may determine a first quality of the first child node. In some embodiments, the system may perform one or more processes to determine the first quality of the first child node. For example, the system may determine a quality of the first node. The system may compare the quality to the first quality threshold. In response to determining that the quality meets or exceeds the first quality threshold, the system may determine the first quality of the first child node.

In some embodiments, when determining the first quality of the first child node, the system may determine a first subset of child nodes for the first child node, wherein each node of the first subset of child nodes is a child node of the first child node. The system may determine a respective quality for each of the first subset of child nodes. The system may aggregate the respective quality for each of the first subset of child nodes.

At step 610, process 600 (e.g., using one or more components described in system 100 (FIG. 1)) compares the first quality to the first quality threshold. For example, the system may compare the first quality to the first quality threshold. In some embodiments, the system may retrieve the first quality in response to determining that the first child node is a child node of the first node.

At step 612, process 600 (e.g., using one or more components described in system 100 (FIG. 1)) modifies the first object to indicate that the first node has the first child node. For example, the system may modify the first object, in the user interface, to indicate that the first node has the first child node in the hierarchical tree in response to determining that the first quality meets or exceeds the first quality threshold. For example, in some embodiments, the first object does not indicate that the first node has the first child node in the hierarchical tree prior to receiving the first user input.

In some embodiments, the system may receive additional user inputs. For example, the system may receive a second user input selecting the first object. In response to receiving the second user input selecting the first object, the system may generate for display a third object, in the user interface, that corresponds to the first child node in the hierarchical tree. In some embodiments, the system may receive a second user input selecting a second quality threshold. The system may compare the first quality to the second quality threshold. In response to determining that the first quality does not meet or exceed the second quality threshold, the system may modify the first object, in the user interface, to indicate that the first node does not have the first child node in the hierarchical tree.

Additionally or alternatively, the system may modify one or more additional objects (e.g., either in series and/or in parallel). For example, the system may generate for display, in the user interface, a second object corresponding to a second node in the hierarchical tree. The system may determine a second child node for the second node. The system may determine a second quality of the second child node. The system may compare the second quality to the first quality threshold. In response to determining that the second quality does not meet or exceed the first quality threshold, the system may not modify the second object in the user interface, to indicate that the second node has the second child node in the hierarchical tree.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the steps, devices, or equipment discussed in relation to FIGS. 1-5 could be used to perform one or more of the steps in FIG. 6.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method for cascade filtering for data exploration in computer systems, the method comprising: generating for display, in a user interface, a first object corresponding to a first node in a hierarchical tree; receiving a first user input selecting a first quality threshold; determining a first child node for the first node; determining a first quality of the first child node; comparing the first quality to the first quality threshold; and in response to determining that the first quality meets or exceeds the first quality threshold, modifying the first object, in the user interface, to indicate that the first node has the first child node in the hierarchical tree.

2. The method of any one of the preceding embodiments, further comprising: determining a quality of the first node; comparing the quality to the first quality threshold; and in response to determining that the quality meets or exceeds the first quality threshold, determining the first quality of the first child node.

3. The method of any one of the preceding embodiments, further comprising: accessing a data structure comprising metadata related to nodes in the hierarchical tree; determining a record in the data structure corresponding to the first quality; and retrieving the first quality from the record.

4. The method of any one of the preceding embodiments, wherein determining the first quality of the first child node further comprises: determining a first subset of child nodes for the first child node, wherein each node of the first subset of child nodes is a child node of the first child node; determining a respective quality for each of the first subset of child nodes; and aggregating the respective quality for each of the first subset of child nodes.

5. The method of any one of the preceding embodiments, wherein the first object does not indicate that the first node has the first child node in the hierarchical tree prior to receiving the first user input.

6. The method of any one of the preceding embodiments, wherein the first user input is received via a user modifying a position of an icon on a track bar.

7. The method of any one of the preceding embodiments, further comprising: generating for display, in the user interface, a second object corresponding to a second node in the hierarchical tree; determining a second child node for the second node; determining a second quality of the second child node; comparing the second quality to the first quality threshold; and in response to determining that the second quality does not meet or exceed the first quality threshold, not modifying the second object in the user interface, to indicate that the second node has the second child node in the hierarchical tree.

8. The method of any one of the preceding embodiments, further comprising retrieving the first quality in response to determining that the first child node is a child node of the first node.

9. The method of any one of the preceding embodiments, further comprising: receiving a second user input selecting the first object; and in response to receiving the second user input selecting the first object, generating for display a third object, in the user interface, that corresponds to the first child node in the hierarchical tree.

10. The method of any one of the preceding embodiments, further comprising: receiving a second user input selecting a second quality threshold; comparing the first quality to the second quality threshold; and in response to determining that the first quality does not meet or exceed the second quality threshold, modifying the first object, in the user interface, to indicate that the first node does not have the first child node in the hierarchical tree.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

What is claimed is:

1. A system for cascade filtering for data exploration in computer systems, the system comprising:
   one or more processors; and
   a non-transitory, computer-readable medium comprising instructions that one executed by the one or more processors cause operations comprising:
   accessing a data structure, wherein the data structure comprising metadata related to nodes in a hierarchical tree;
   retrieving, from the data structure, a quality of a first node in the hierarchical tree;
   receiving a first user input selecting a first quality threshold, wherein the first user input is received via a user modifying a position of an icon on a track bar;
   comparing the quality to the first quality threshold;
   in response to determining that the quality meets or exceeds the first quality threshold, determining a first child node for the first node;
   determining a first quality of the first child node;
   comparing the first quality to the first quality threshold;
   generating for display, in a user interface, a first object corresponding to the first node; and
   modifying the first object, in the user interface, to indicate that the first node has the first child node in the hierarchical tree in response to determining that the first quality meets or exceeds the first quality threshold, wherein the first object does not indicate that the first node has the first child node in the hierarchical tree prior to receiving the first user input.

2. A method for cascade filtering for data exploration in computer systems, the method comprising:
   generating for display, in a user interface, a first object corresponding to a first node in a hierarchical tree;
   receiving a first user input selecting a first quality threshold;
   determining a first child node for the first node;
   determining a first quality of the first child node;
   comparing the first quality to the first quality threshold; and
   in response to determining that the first quality meets or exceeds the first quality threshold, modifying the first object, in the user interface, to indicate that the first node has the first child node in the hierarchical tree.

3. The method of claim 2, further comprising:
   determining a quality of the first node;
   comparing the quality to the first quality threshold; and
   in response to determining that the quality meets or exceeds the first quality threshold, determining the first quality of the first child node.

4. The method of claim 2, further comprising:
   accessing a data structure comprising metadata related to nodes in the hierarchical tree; and
   determining a record in the data structure corresponding to the first quality; and retrieving the first quality from the record.

5. The method of claim 2, wherein determining the first quality of the first child node further comprises:
   determining a first subset of child nodes for the first child node, wherein each node of the first subset of child nodes is a child node of the first child node;
   determining a respective quality for each of the first subset of child nodes; and
   aggregating the respective quality for each of the first subset of child nodes.

6. The method of claim 2, wherein the first object does not indicate that the first node has the first child node in the hierarchical tree prior to receiving the first user input.

7. The method of claim 2, wherein the first user input is received via a user modifying a position of an icon on a track bar.

8. The method of claim 2, further comprising:
   generating for display, in the user interface, a second object corresponding to a second node in the hierarchical tree;
   determining a second child node for the second node;
   determining a second quality of the second child node;
   comparing the second quality to the first quality threshold; and
   in response to determining that the second quality does not meet or exceed the first quality threshold, not modifying the second object in the user interface, to indicate that the second node has the second child node in the hierarchical tree.

9. The method of claim 2, further comprising retrieving the first quality in response to determining that the first child node is a child node of the first node.

10. The method of claim 2, further comprising:
    receiving a second user input selecting the first object; and
    in response to receiving the second user input selecting the first object, generating for display a third object, in the user interface, that corresponds to the first child node in the hierarchical tree.

11. The method of claim 2, further comprising:
    receiving a second user input selecting a second quality threshold;
    comparing the first quality to the second quality threshold; and
    in response to determining that the first quality does not meet or exceed the second quality threshold, modifying the first object, in the user interface, to indicate that the first node does not have the first child node in the hierarchical tree.

12. A non-transitory, computer-readable medium for cascade filtering for data exploration in computer systems comprising instructions that when executed by one or more processors, cause operations comprising:
  generating for display, in a user interface, a first object corresponding to a first node in a hierarchical tree;
  receiving a first user input selecting a first quality threshold;
  determining a first child node for the first node;
  determining a first quality of the first child node;
  comparing the first quality to the first quality threshold; and
  in response to determining that the first quality meets or exceeds the first quality threshold, modifying the first object, in the user interface, to indicate that the first node has the first child node in the hierarchical tree.

13. The non-transitory, computer-readable medium of claim 12, wherein the instructions further cause operations comprising:
  determining a quality of the first node;
  comparing the quality to the first quality threshold; and
  in response to determining that the quality meets or exceeds the first quality threshold, determining the first quality of the first child node.

14. The non-transitory, computer-readable medium of claim 12, wherein the instructions further cause operations comprising:
  accessing a data structure comprising metadata related to nodes in the hierarchical tree; and
  determining a record in the data structure corresponding to the first quality; and retrieving the first quality from the record.

15. The non-transitory, computer-readable medium of claim 12, wherein determining the first quality of the first child node further comprises:
  determining a first subset of child nodes for the first child node, wherein each node of the first subset of child nodes is a child node of the first child node;
  determining a respective quality for each of the first subset of child nodes; and
  aggregating the respective quality for each of the first subset of child nodes.

16. The non-transitory, computer-readable medium of claim 12, wherein the first object does not indicate that the first node has the first child node in the hierarchical tree prior to receiving the first user input.

17. The non-transitory, computer-readable medium of claim 12, wherein the first user input is received via a user modifying a position of an icon on a track bar.

18. The non-transitory, computer-readable medium of claim 12, wherein the instructions further cause operations comprising:
  generating for display, in the user interface, a second object corresponding to a second node in the hierarchical tree;
  determining a second child node for the second node;
  determining a second quality of the second child node;
  comparing the second quality to the first quality threshold; and
  in response to determining that the second quality does not meet or exceed the first quality threshold, not modifying the second object in the user interface, to indicate that the second node has the second child node in the hierarchical tree.

19. The non-transitory, computer-readable medium of claim 12, wherein the instructions further cause operations comprising:
  receiving a second user input selecting the first object; and
  in response to receiving the second user input selecting the first object, generating for display a third object, in the user interface, that corresponds to the first child node in the hierarchical tree.

20. The non-transitory, computer-readable medium of claim 12, wherein the instructions further cause operations comprising:
  receiving a second user input selecting a second quality threshold;
  comparing the first quality to the second quality threshold; and
  in response to determining that the first quality does not meet or exceed the second quality threshold, modifying the first object, in the user interface, to indicate that the first node does not have the first child node in the hierarchical tree.

* * * * *